United States Patent
Bieswanger et al.

(10) Patent No.: US 9,542,226 B2
(45) Date of Patent: Jan. 10, 2017

(54) OPERATING PROGRAMS ON A COMPUTER CLUSTER

(71) Applicant: International Business Machines Corporation, Armonk, NY (US)

(72) Inventors: Andreas Bieswanger, Ehningen (DE); Ilija Leoshkevich, Mramornaya (RU)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 14/315,518

(22) Filed: Jun. 26, 2014

(65) Prior Publication Data

US 2015/0100968 A1   Apr. 9, 2015

(30) Foreign Application Priority Data

Oct. 7, 2013  (GB) .................................. 1317670.6

(51) Int. Cl.
 *G06F 9/50* (2006.01)
 *G06F 9/455* (2006.01)

(52) U.S. Cl.
 CPC ......... *G06F 9/5011* (2013.01); *G06F 9/45558* (2013.01); *G06F 9/5072* (2013.01); *G06F 9/5077* (2013.01); *G06F 2009/45595* (2013.01)

(58) Field of Classification Search
 None
 See application file for complete search history.

(56) References Cited

U.S. PATENT DOCUMENTS

| | | |
|---|---|---|
| 6,003,075 A | 12/1999 | Arendt et al. |
| 6,247,109 B1 | 6/2001 | Kleinsorge et al. |

(Continued)

FOREIGN PATENT DOCUMENTS

| | | |
|---|---|---|
| DE | 102012203534 A1 | 9/2012 |
| EP | 2503449 A2 | 9/2012 |
| JP | 201150514 A | 8/2011 |

OTHER PUBLICATIONS

Tang, Hong, Kai Shen, and Tao Yang. "Program transformation and runtime support for threaded MPI execution on shared-memory machines." ACM Transactions on Programming Languages and Systems (TOPLAS) 22.4 (2000): 673-700.*

(Continued)

*Primary Examiner* — Matthew Brophy
(74) *Attorney, Agent, or Firm* — Stephen R. Tkacs; Stephen J. Walder, Jr.; Joseph Petrokaitis

(57) ABSTRACT

A mechanism is provided for operating programs on a computer cluster comprising cluster resources. The cluster resources comprise non-virtual real hardware resources with variable configurations and virtual resources. Each cluster resource has a configuration description and a type. Each type has a unique type identification and descriptions of operations that can be performed by the cluster resource of the each type. Each program is operable for: requesting usage of the cluster resource specifying the type and the configuration description; and requesting a modification of the variable configuration of the non-virtual real hardware resource with the variable configuration. Execution of each program requires the dedicated execution environment on the computer cluster. The generation of each dedicated execution environment requires one or more dedicated virtual resources and one or more dedicated non-virtual real hardware resources with the variable configurations.

20 Claims, 8 Drawing Sheets

(56) References Cited

U.S. PATENT DOCUMENTS

| | | | | |
|---|---|---|---|---|
| 7,774,191 | B2* | 8/2010 | Berkowitz | G06F 9/3004 |
| | | | | 703/23 |
| 8,078,728 | B1 | 12/2011 | Pollan et al. | |
| 8,166,458 | B2 | 4/2012 | Li et al. | |
| 8,171,473 | B2* | 5/2012 | Lavin | G06F 9/45533 |
| | | | | 717/118 |
| 8,181,174 | B2 | 5/2012 | Liu | |
| 8,219,987 | B1 | 7/2012 | Vlaovic et al. | |
| 8,904,008 | B2* | 12/2014 | Calder | G06F 9/5033 |
| | | | | 709/223 |
| 2004/0249947 | A1* | 12/2004 | Novaes | G06F 9/45537 |
| | | | | 709/226 |
| 2005/0223362 | A1 | 10/2005 | Whitlock et al. | |
| 2008/0189468 | A1* | 8/2008 | Schmidt | G06F 11/203 |
| | | | | 711/6 |
| 2009/0204964 | A1* | 8/2009 | Foley | G06F 21/53 |
| | | | | 718/1 |
| 2010/0017517 | A1 | 1/2010 | Arai et al. | |
| 2010/0031325 | A1* | 2/2010 | Maigne | G06F 9/45533 |
| | | | | 726/4 |
| 2010/0070725 | A1* | 3/2010 | Prahlad | G06F 11/1453 |
| | | | | 711/162 |
| 2011/0176441 | A1 | 7/2011 | Matsuoka | |
| 2011/0244440 | A1 | 10/2011 | Saxon et al. | |
| 2012/0110086 | A1* | 5/2012 | Baitinger | G06F 9/5077 |
| | | | | 709/205 |
| 2012/0110154 | A1* | 5/2012 | Adlung | G06F 9/5077 |
| | | | | 709/223 |
| 2012/0110155 | A1* | 5/2012 | Adlung | G06F 9/5077 |
| | | | | 709/223 |
| 2012/0110164 | A1* | 5/2012 | Frey | G06F 9/5077 |
| | | | | 709/224 |
| 2012/0110588 | A1* | 5/2012 | Bieswanger | G06F 8/65 |
| | | | | 718/104 |
| 2012/0266135 | A1 | 10/2012 | Mansour et al. | |
| 2012/0317567 | A1* | 12/2012 | Bailey | H04L 41/04 |
| | | | | 718/1 |
| 2012/0324281 | A1 | 12/2012 | Goroff et al. | |
| 2013/0297964 | A1* | 11/2013 | Hegdal | G06F 11/0712 |
| | | | | 714/2 |
| 2013/0346987 | A1* | 12/2013 | Raney | G06F 9/5044 |
| | | | | 718/102 |
| 2014/0019964 | A1* | 1/2014 | Neuse | G06F 9/45533 |
| | | | | 718/1 |
| 2014/0019965 | A1* | 1/2014 | Neuse | G06F 9/45533 |
| | | | | 718/1 |
| 2014/0019966 | A1* | 1/2014 | Neuse | G06F 9/45533 |
| | | | | 718/1 |
| 2014/0101657 | A1* | 4/2014 | Bacher | G06F 9/45558 |
| | | | | 718/1 |
| 2014/0380307 | A1* | 12/2014 | Zhu | G06F 9/45533 |
| | | | | 718/1 |
| 2014/0380308 | A1* | 12/2014 | Hassine | G06F 9/45558 |
| | | | | 718/1 |

OTHER PUBLICATIONS

Krsul, Ivan, et al. "Vmplants: Providing and managing virtual machine execution environments for grid computing." Supercomputing, 2004. Proceedings of the ACM/IEEE SC2004 Conference. IEEE, 2004.*

Foster, Ian, et al. "Virtual clusters for grid communities." Cluster Computing and the Grid, 2006. CCGRID 06. Sixth IEEE International Symposium on. vol. 1. IEEE, 2006.*

List of IBM Patents or Patent Applications Treated as Related (Appendix P), 2 pages.

Search Report under Section 17(5) dated Feb. 26, 2014, International Application No. GB1317670.6, 3 pages.

Gao, Jerry et al., "Cloud Testing—Issues, Challenges, Needs and Practice", Software Engineering: An International Journal (SEIJ), vol. 1, No. 1, Sep. 2011, 15 pages.

* cited by examiner

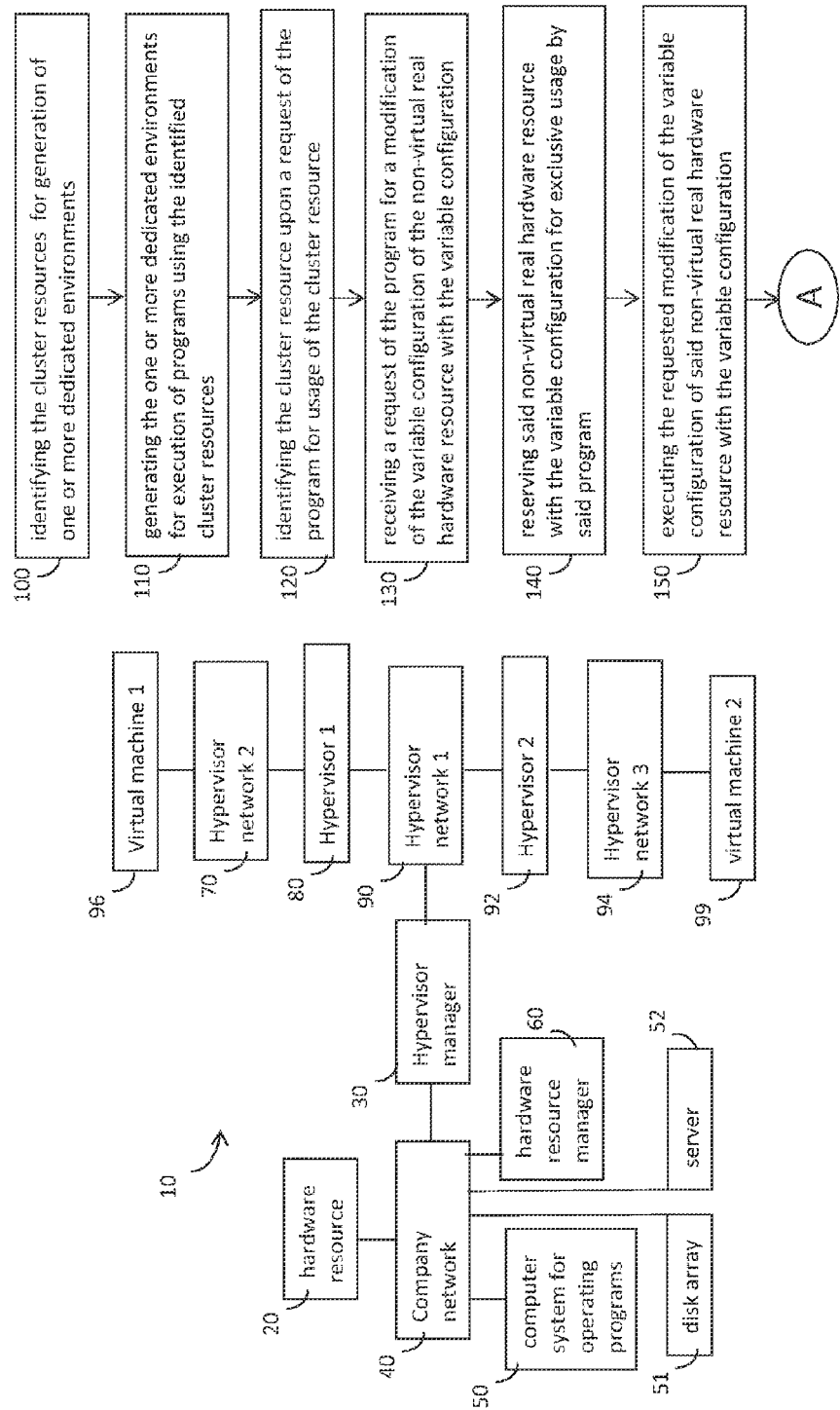

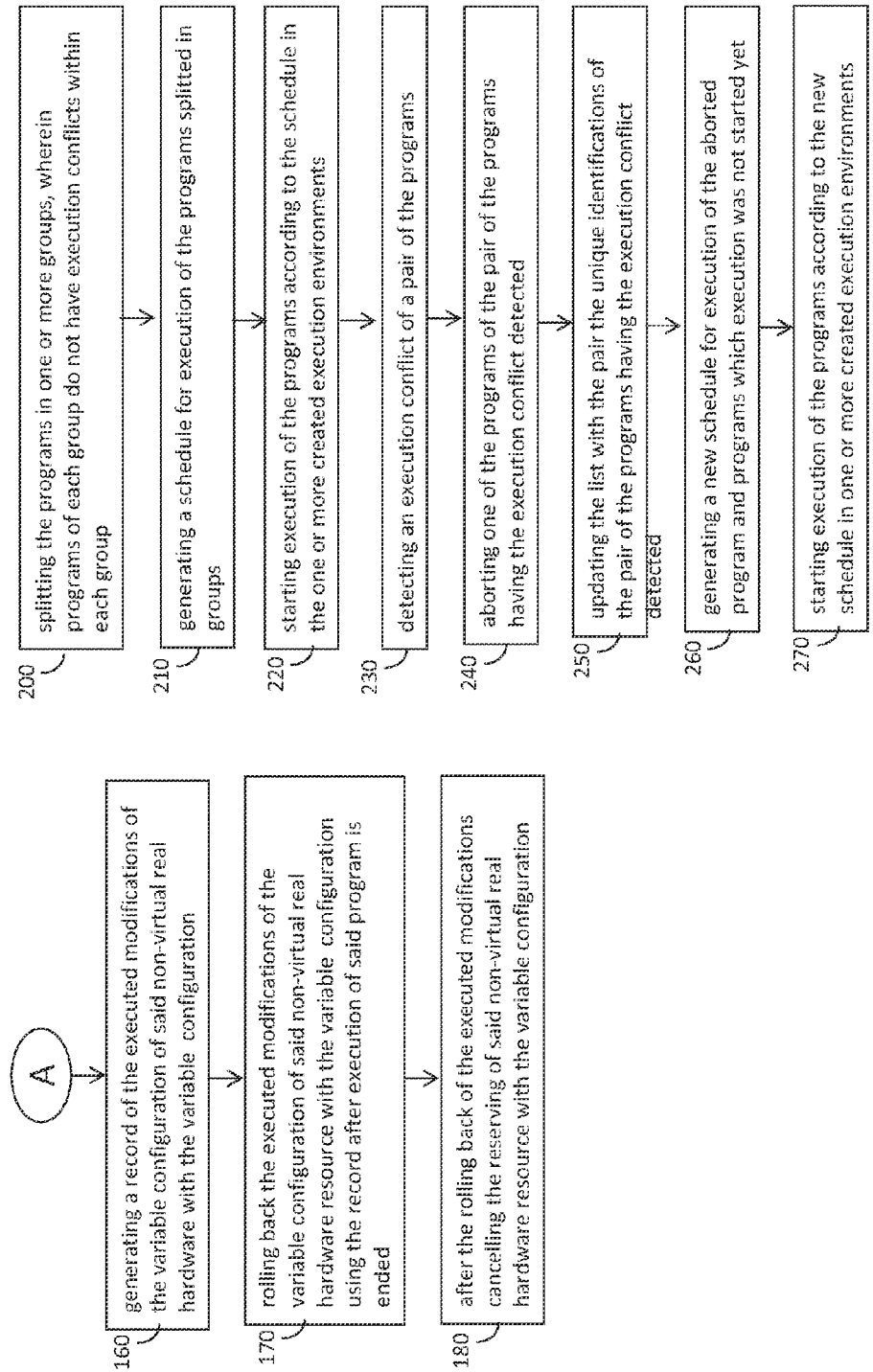

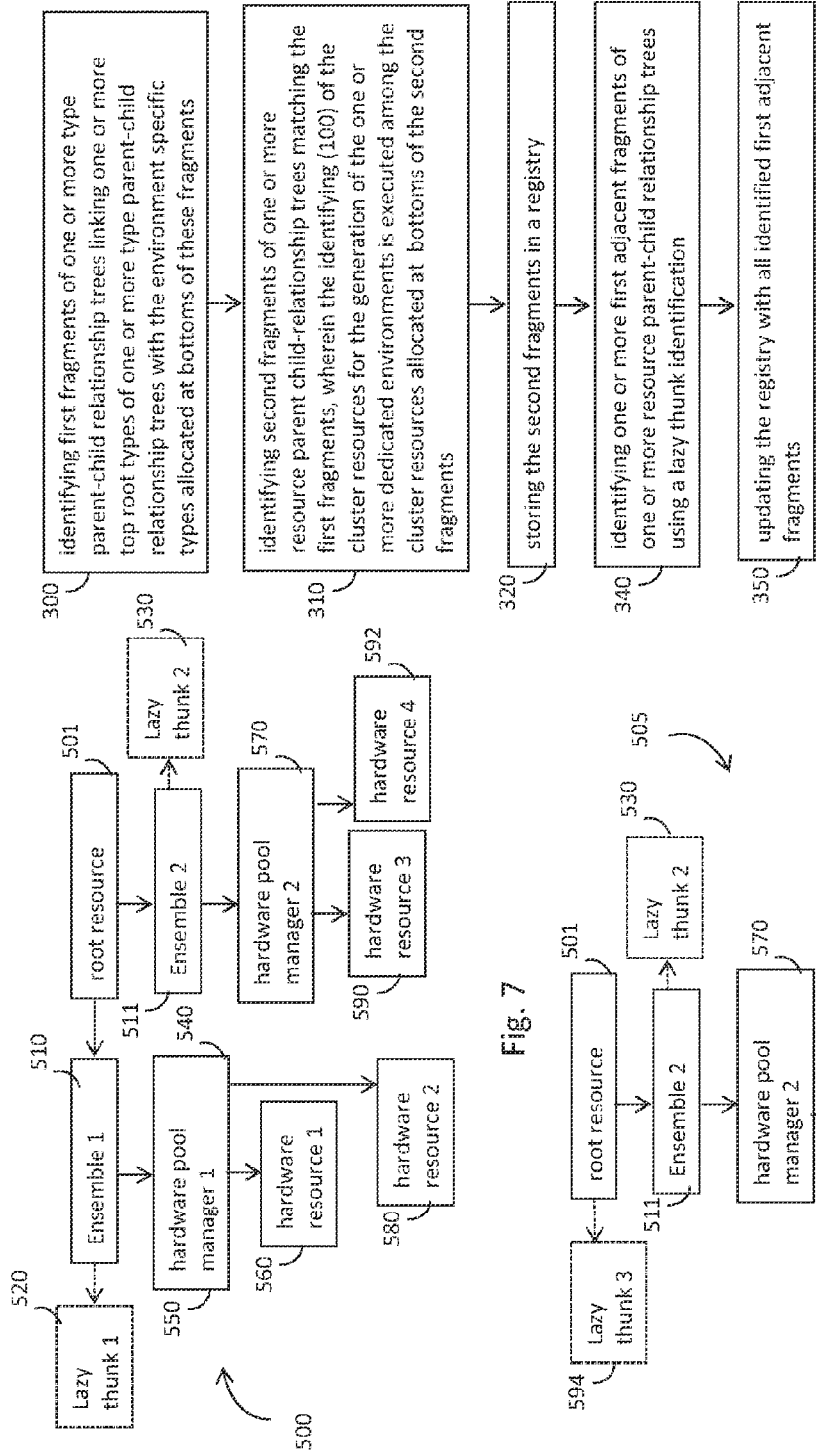

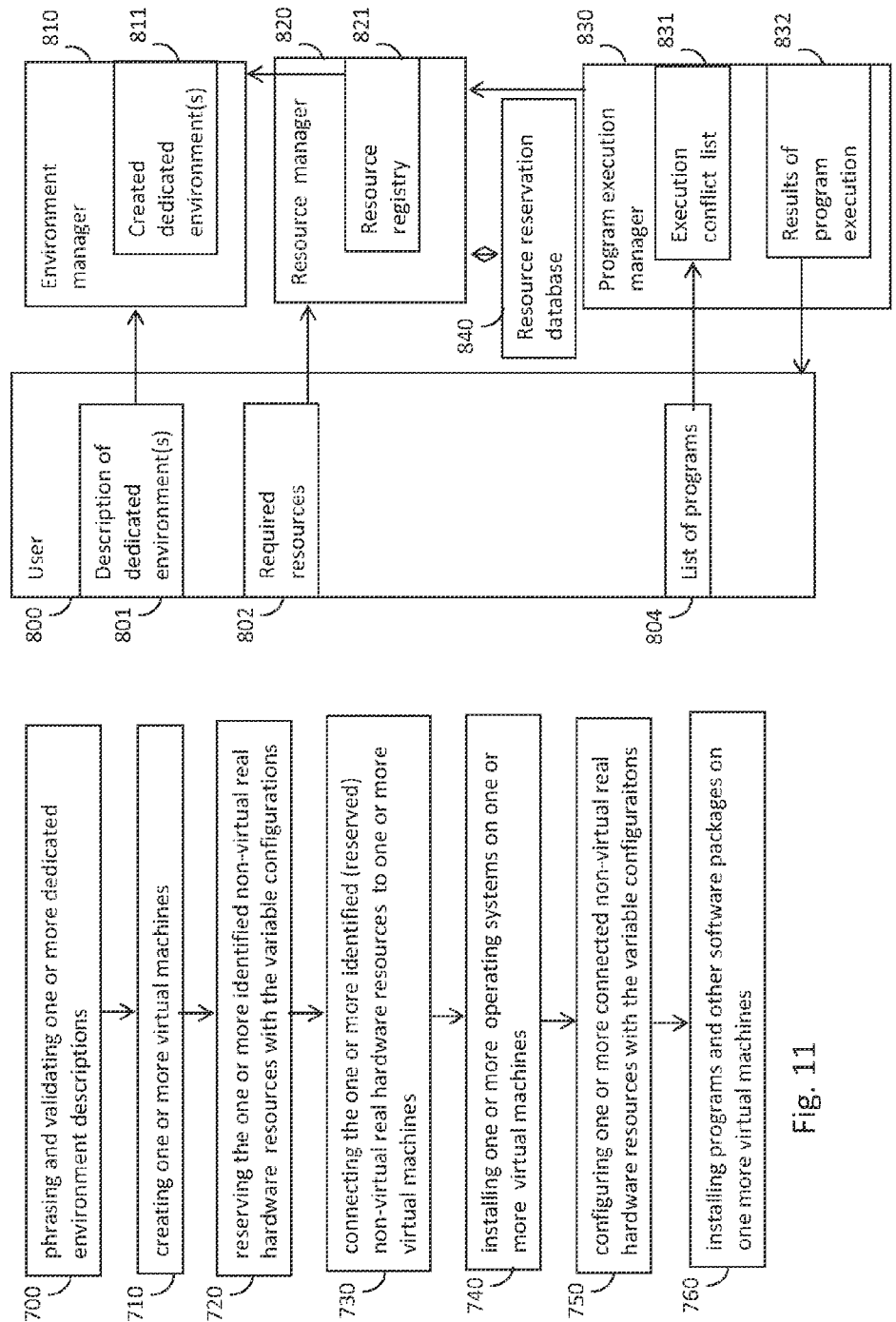

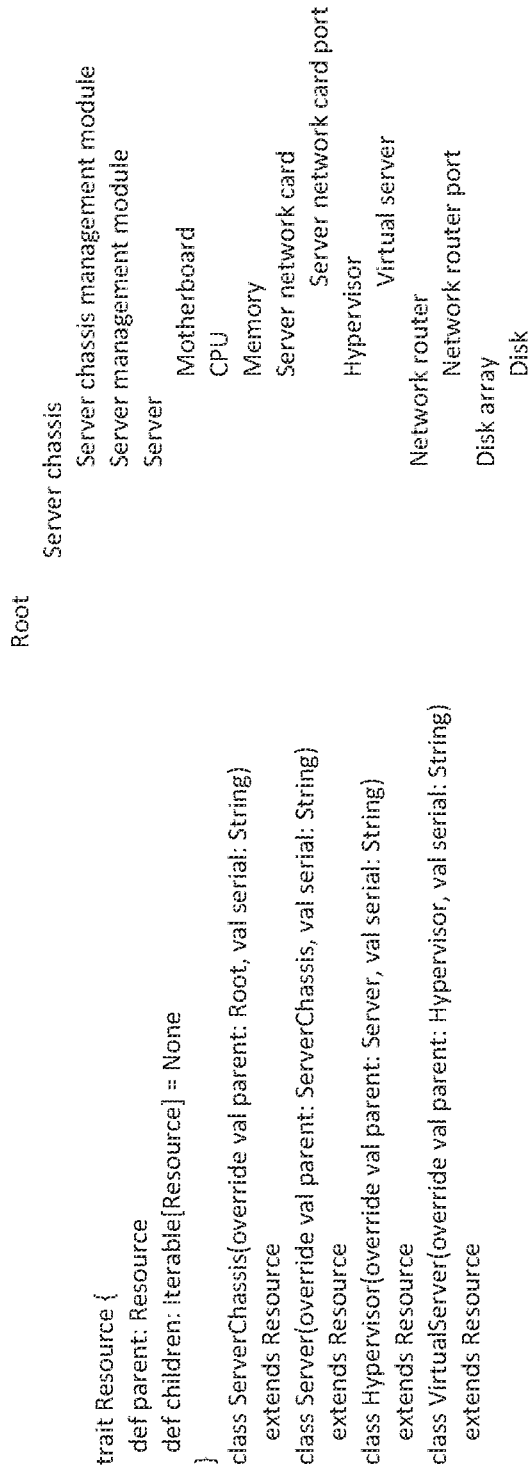

```
trait Resource {
  def parent: Resource
  def children: iterable[Resource] = None
}
class ServerChassis(override val parent: Root, val serial: String)
  extends Resource
class Server(override val parent: ServerChassis, val serial: String)
  extends Resource
class Hypervisor(override val parent: Server, val serial: String)
  extends Resource
class VirtualServer(override val parent: Hypervisor, val serial: String)
  extends Resource
```

Fig. 13

```
Root
  Server chassis
    Server chassis management module
    Server management module
    Server
      Motherboard
      CPU
      Memory
      Server network card
        Server network card port
      Hypervisor
        Virtual server
  Network router
    Network router port
  Disk array
    Disk
```

Fig. 14

OPERATING PROGRAMS ON A COMPUTER CLUSTER

BACKGROUND

The invention refers to a mechanism for operating programs on a computer cluster comprising cluster resources.

Effective operating of computer programs in complex environments comprising virtual and non-virtual real hardware resources is an everlasting task of the computer science. Various virtualization software products are developed in order to create virtual machines for execution of the computer programs. The virtual machines provide optimum functionalities for execution of the computer programs. The problem of operation of the computer programs gets more complicated when execution of programs requires heterogeneous environments comprising virtual and non-virtual real hardware resources. IBM zManager is one of the solutions addressing the problem mentioned above. zManager is operable for controlling a System z mainframe with System x and System p blade center extensions. Functionality provided by zManager ranges from configuration of individual System z/x/p units to creating heterogeneous virtual machines being connected into virtual networks and having storage area network (SAN) attached.

SUMMARY

The present invention provides embodiments that fill the need of improved operating of computer programs on computer clusters comprising virtual and non-virtual real hardware resources. It should be appreciated that the present invention can be implemented in numerous ways, including as a process, a method, an apparatus, a system, a device, or a computer program product carrying computer executable code for execution by a processor controlling the apparatus. Several inventive embodiments are described below.

One embodiment provides for a computer implemented method for operating programs executable on a computer cluster. The computer cluster comprises the following cluster resources: non-virtual real hardware resources with variable configurations and virtual resources. Each cluster resource has a configuration description and a type. Each type has a unique type identification and descriptions of operations which can be performed by the cluster resource of the each type. Each program is operable for: requesting usage of the cluster resource specifying the type and the configuration description; and requesting a modification of the variable configuration of the non-virtual real hardware resource with the variable configuration. Execution of each program requires a dedicated execution environment on the computer cluster. Generation of each dedicated execution environment requires the following dedicated resources: one or more dedicated virtual resources and one or more dedicated non-virtual real hardware resources with the variable configurations. Each dedicated resource has an execution environment specific type and an execution environment specific configuration description. The method comprises the following steps.

The cluster resources for generation of the one or more dedicated execution environments are identified. Each identified cluster resource matches one dedicated resource. Each identified cluster resource and the matching dedicated resource have the same type and the configuration description of each identified cluster resource comprises the execution environment specific configuration description of the matching dedicated resource.

The one or more dedicated execution environments for execution of programs are generated using the identified cluster resources.

The cluster resource is identified upon a request of the program for usage of the cluster resource. The identified cluster resource has the specified type. The configuration description of the identified cluster resource comprises the specified configuration description.

In response to a request of the program for a modification of the variable configuration of the non-virtual real hardware resource with the variable configuration executing the following is performed: the non-virtual real hardware resource with the variable configuration is reserved for exclusive usage by the program, and after the reserving of the non-virtual real hardware resource with the variable configuration for exclusive usage by said program the requested modification of the variable configuration of said non-virtual real hardware resource with the variable configuration is executed.

A record of the executed modifications of the variable configuration of the non-virtual real hardware with the variable configuration is generated.

The executed modifications of the variable configuration of said non-virtual real hardware resource with the variable configuration are rolled back using the record after execution of said program is ended.

After the rolling back of the executed modifications, the reserving of the non-virtual real hardware resource with the variable configuration is cancelled.

In another embodiment, at least a portion of the programs has execution conflicts. Each program has a unique identification. The unique identifications of the programs having execution conflicts are stored in a list comprising one or more pairs of the unique identifications of the programs having execution conflicts when both programs of any pair are executed concurrently.

The computer implemented method further comprises the following: splitting the programs in a minimum possible number of groups, wherein each group comprises no pairs of the programs having corresponding pairs of the unique identifications in the list; generating a schedule for execution of the programs is generated, wherein all programs of each group are scheduled for concurrent execution and the groups of the programs are scheduled for consecutive execution, wherein consecutive execution of the groups is prioritized according to the number of the programs in the groups, wherein the group comprising the highest number of programs is scheduled as the first one for execution and the group comprising the least number of programs is scheduled as the last one for execution, wherein in a case when two groups comprise the same number of programs these groups are prioritized at random; starting execution of the programs according to the schedule in the one or more created execution environments; detecting an execution conflict of a pair of the programs; aborting one of the programs of the pair of the programs having the execution conflict detected; updating the list with the pair of the unique identifications of the pair of the programs having the execution conflict detected; generating a new schedule for execution of the aborted program and programs for which execution was not started yet; starting execution of the programs according to the new schedule in the one or more created execution environments after execution of the group comprising another program of the pair is finished.

In yet another embodiment, at least a portion of programs has execution conflicts. Each program has a unique identification. The unique identifications of the programs having execution conflicts are stored in a list comprising one or more pairs of the unique identifications of the programs having execution conflicts when both programs of any pair are executed concurrently.

The computer implemented method further comprises the following: a) generating an additional group; b) assigning one of the not yet assigned programs having no execution conflicts with all programs assigned to the additionally generated group; c) repeating steps b)-c) until there are no programs left which have no execution conflicts with any of the programs of the additionally generated group; d) iteratively repeating the steps a)-d), wherein the repeating is continued until all programs are assigned to one or more groups, wherein exactly one additional group is generated during each repeating of the steps a)-d), wherein all pairs comprising at least one unique identification of any of the programs assigned to any previously generated additional group are considered as being deleted from the list during the subsequent repeating of the steps a)-d); generating a schedule for execution of the programs, wherein all programs of each group are scheduled for concurrent execution and the groups of the programs are scheduled for consecutive execution, wherein consecutive execution of the groups is prioritized according to the number of the programs in the groups, wherein the group comprising the highest number of programs is scheduled as the first one for execution and the group comprising the least number of programs is scheduled as the last one for execution, wherein in a case when two groups comprise the same number of programs these groups are prioritized at random; starting execution of the programs according to the schedule in the one or more created execution environments; detecting an execution conflict of a pair of the programs; aborting one of the programs of the pair of the programs having the execution conflict detected; updating the list with the pair of the unique identifications of the pair of the programs having the execution conflict detected; after the updating of the list with the pair of the unique identifications of the pair of the programs having the execution conflict detected identifying all programs, which pairs in the list comprise the unique identification of the aborted program; identifying whether one or more not yet executed groups do not comprise any identified program, if yes assigning the aborted program to the not yet executed group not comprising any identified programs and having the highest priority for execution among the not yet executed groups and if no scheduling execution of the aborted program after execution of the last group.

In yet another embodiment, the aborted program of the pair of the programs is the program having a bigger number of the cluster resources requested for usage in comparison with another program of said pair.

In yet another embodiment, the aborted program of the pair of the programs is the program having lower percentage of the executed workload in comparison with another program of the pair.

In yet another embodiment, the aborted program of the pair of the programs is the program having a shorter duration of execution in comparison with another program of the pair.

In yet another embodiment, the cluster resources are hierarchically allocated within one or more resource parent-child relationship trees and linked by resource parent-child relationships with each other within the one or more resource parent-child relationship trees. Each resource parent-child relationship tree matches a type parent-child relationship tree comprising the hierarchically allocated types linked by type parent-child relations within the type parent-child relationship tree, wherein each resource parent-child relationship tree has one top root cluster resource, wherein each type parent-child relationship tree has one top root type, wherein each top root cluster resource of each resource parent-child relationship tree has the top root type of the type parent-child relationship tree matching the each resource parent-child relationship tree, wherein the resource parent-child relationships match the type parent-child relationships of their types.

The computer implemented method further comprises the following: identifying first fragments of the one or more type parent-child relationship trees linking the one or more top root types of the first fragments with the environment specific types allocated at bottoms of the first fragments; identifying second fragments of the one or more resource parent child-relationship trees matching the first fragments, wherein the identifying of the cluster resources for the generation of the one or more dedicated environments is performed using the cluster resources allocated at the bottoms of the second fragments, wherein all cluster resources allocated at bottoms of the second fragments have the environment specific types; storing the second fragments in a registry; identifying one or more first adjacent fragments of the one or more resource parent-child relationship trees using a lazy thunk identification, wherein each first adjacent fragment is adjacent to one of the second fragments; updating the registry with the one or more identified first adjacent fragments.

In yet another embodiment, the computer implemented method further comprises the following: checking whether at least one of the cluster resources allocated in the fragments of the one or more resource parent-child relationship trees stored in the registry has the specified type and has the configuration description comprising the specified configuration description, if yes the identifying of the cluster resource upon the request of the program for usage of the cluster resource is performed using the fragments of one or more resource parent-child relationship trees stored in the registry and if no, performing the following: identifying one or more third fragments of the one or more type parent-child relationship trees linking the one or more top root types of one or more type parent-child relationship trees with the specified type allocated at one or more bottoms of the one or more third fragments; identifying one or more fourth fragments of one or more resource parent child-relationship trees matching the one or more third fragments, wherein the identifying of the cluster resource upon the request of the program for usage of the cluster resource is performed using the cluster resources allocated at one or more bottoms of the one or more fourth fragments, wherein all cluster resources allocated at the one or more bottoms of the one or more fourth fragments have the specified type; updating registry with all fourth fragments; identifying one or more second adjacent fragments of one or more resource parent-child relationship trees using the lazy thunk identification, wherein each second adjacent fragment is adjacent to one of the one or more fourth fragments; and updating the registry with the one or more second adjacent fragments.

In yet another embodiment, the identifying of the one or more fragments of the one or more resource parent child-relationship trees is performed applying one or more predefined identification constrains restricting the identifying of the fragments of the one or more resource parent-child relationship trees.

In yet another embodiment, the dedicated execution environment comprises a virtual machine operated by an operating system, wherein the generating of the one or more dedicated execution environments using the identified cluster resources comprises: creating the virtual machine using one or more identified virtual resources; connecting the identified non-virtual real hardware resource with the variable configuration to the virtual machine; and installing the operating system on the virtual machine.

Yet another embodiment provides for a computer system for operating programs executable on a computer cluster. The computer system is operable for performing all or a portion of the steps of the aforementioned computer implemented method.

Yet another embodiment provides for a computer program product, in particular a computer readable medium. The computer program product carries computer executable code for execution by a processor controlling an apparatus. Execution of the instructions cause the processor to perform all or a portion of steps of the aforementioned computer implemented method.

BRIEF DESCRIPTION OF THE DRAWINGS

The present invention will be readily understood by the following detailed description in conjunction with the accompanying drawings.

FIG. 1 is a block diagram of an example computer cluster.

FIG. 2a-b is a flowchart of process blocks for operating programs on a computer cluster.

FIG. 3 is a flowchart of process blocks for operating programs on a computer cluster according to a schedule.

FIG. 7 is an example fragment of a resource parent-child relationship tree of cluster resources.

FIG. 8 is a flowchart of process blocks for identification of cluster resources.

FIG. 9 is another example fragment of the resource parent-child relationship tree of cluster resources.

FIG. 11 is a flowchart of process blocks for generating a dedicated environment.

FIG. 12 is a block diagram of software for operating programs on a computer cluster.

FIG. 13 is a fragment of a program code.

FIG. 14 is an example of a hierarchy and parent-child relationships of types of computer cluster resources.

DETAILED DESCRIPTION

Figure 4:
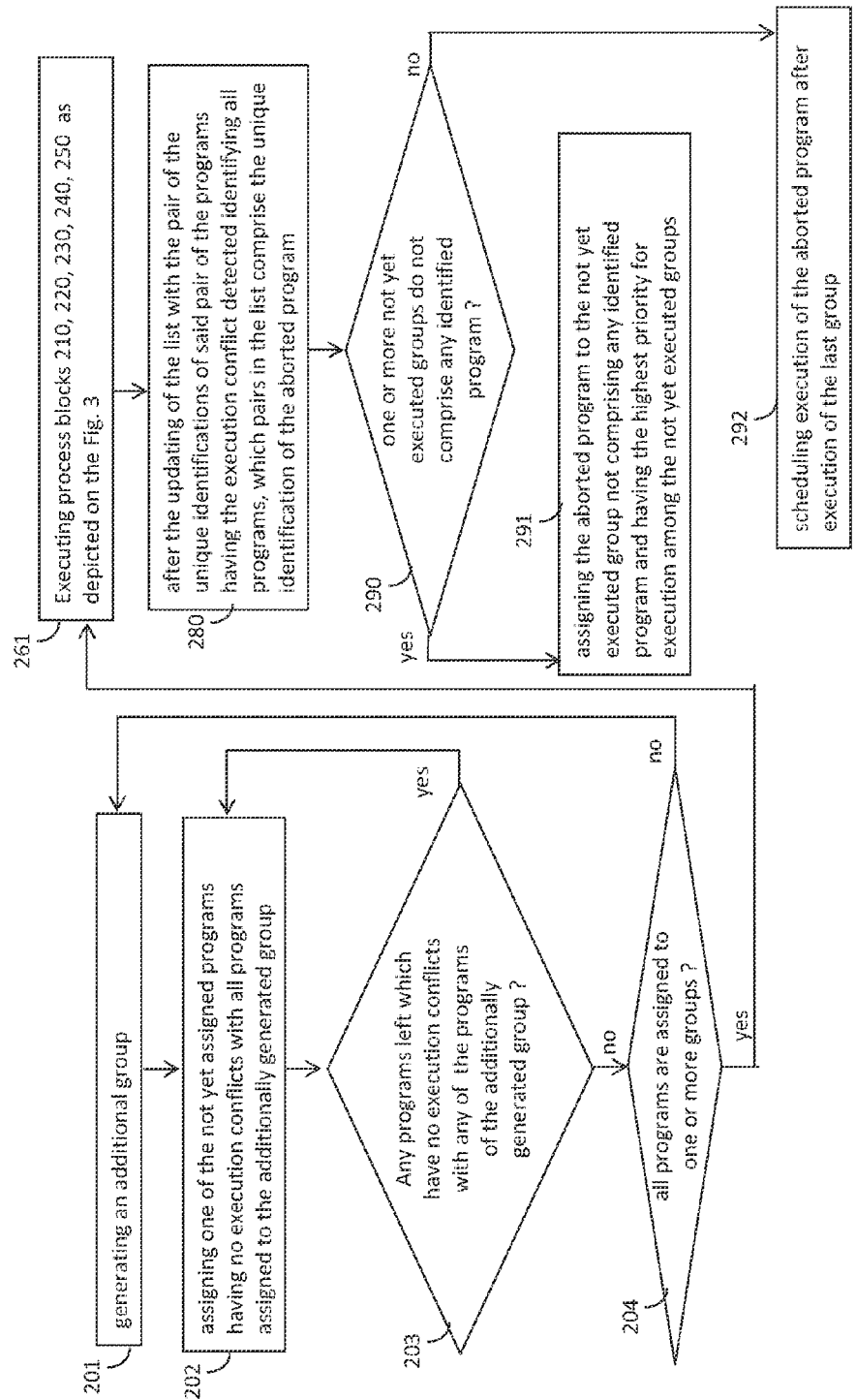
FIG. 4 is a flowchart of process blocks for splitting of programs in groups used for generation of an execution schedule and execution of the programs according to the execution schedule.

Effective operating/managing of execution of programs on a computer cluster requires a lot of issues to be addressed in an effective and coherent way. The simplest solution comprising creation of a virtual machine for each program and reduction of cluster resource sharing to a minimum in order to avoid sharing conflicts is a good option only in a case when resources of the computer cluster are not limited. As usual, it is not the case. Thus, in order to maximize effectiveness of the computer cluster utilization there is a need for a solution enabling the following: effective identification and management of cluster resources needed for execution of the programs and generation of an effective schedule for execution of programs, wherein execution conflicts of the programs are minimized. Special measures have to be taken for management of cluster resources with variable configurations. The program may execute changes in configurations of the cluster resources. These changes may compromise execution of other programs sharing the cluster resource having variable configuration modified by one of the programs. Moreover, these changes may cause further a malfunction of the cluster resource. This problem gets more complicated when the program has modified the variable configuration of a non-virtual real hardware resource. In a case when the program that has executed these changes is aborted, there is no other way to restore this resource to its original state, other than rebooting it. This operation may cost a lot of time and compromise performance of the computer cluster. As it will be clearly seen from the following description the present invention addresses these issues in an effective way.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing: In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will also be noted that each process block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an example block diagram of a computer cluster 10 used for execution of programs. The computer cluster comprises the following cluster resources: non-virtual real hardware resources with variable configurations and virtual resources. Merely by means of example, the computer cluster further comprises the following cluster resources: a hardware resource 20, a company network 40, a computer system for operating programs 50, a hardware resource manager 60, a hypervisor manager 30, a first virtual machine 96, a second hypervisor network 70, a first hypervisor 80, a first hypervisor network 90, a second hypervisor 92, a third hypervisor network 94, a disk array 51, and a second virtual machine 99. In the aforementioned example, the first and the second hypervisor and the first and the second virtual machines are the virtual resources, while all other resources depicted in FIG. 1 are the non-virtual real hardware resources with the variable configurations. The company network links the hardware resource, the hypervisor manager, the hardware resource manager, and the computer system for operating programs. The first hypervisor network links the hypervisor manager, the first hypervisor, and the second hypervisor. The second hypervisor network links the first virtual machine and the first hypervisor. The third hypervisor network links the second virtual machine and the second hypervisor. Each cluster resource has a configuration and a type. Each type has a unique identification and descriptions of operations which can be performed by the cluster resource of each type. The types can be implemented among other ways as follows: as dynamically linked libraries, as operating system drivers, and as network services. The configuration of the cluster resource is a set of characteristics describing the cluster resource and its current state. For instance, the server may have the following configuration: a server chassis serial number, an operating mode of the chassis management module having two possible values 'primary' and 'standby', a central processing unit temperature, and a total and currently available amount of hypervisor memory. Execution of each program requires a dedicated execution environment on the computer cluster. Generation of each dedicated execution environment requires the following dedicated resources: one or more dedicated virtual resources and one or more dedicated non-virtual real hardware resources with the variable configurations. For instance, the dedicated execution environment may comprise two servers and a network switch. Each dedicated resource has an execution environment-specific type and an execution environment-specific configuration description. Each program is operable for: requesting usage from the cluster resource specifying the type and the configuration description, and requesting a modification of the variable configuration for the non-virtual real hardware resource with the variable configuration.

FIG. 2a-b illustrates process blocks of a computer implemented method of operating programs executable on the computer cluster. The method comprises the following process blocks. In the process block 100 the cluster resources required for generation of the one or more dedicated execution environments are identified. Each identified cluster resource matches one dedicated resource. Each identified cluster resource and the matching dedicated resource have the same type. The configuration description of each identified cluster resource comprises the execution environment specific configuration description of the matching dedicated resource. The latter identification criterion can be readily understood on a basis of the following example. For instance the execution environment specific configuration description of the dedicated resource comprises 40 Gb of a solid state drive memory. Any cluster resource having not less than 40 Gb of the solid state drive memory can be identified according to this example criterion. In the next process block 110, the one or more dedicated execution environments for execution of the programs using the identified cluster resources are generated. In the process block 120 the cluster resource is identified upon a request for usage of the program. The identified cluster resource has the specified type. The configuration description of the identified cluster resource comprises the specified configuration description.

The latter identification criterion can be readily understood on a basis of the aforementioned example regarding a volume of memory. In the process block 130 a request of the program for modification of the variable configuration of the non-virtual real hardware resource with the variable configuration is received. In response to receiving of the request of the program for the modification of the variable configuration of the non-virtual real hardware resource with the variable configuration in the process block 130, the process block 140 is executed. In the process block 140 the non-virtual real hardware resource with the variable configuration which variable configuration was requested to be modified by the program, is reserved for exclusive usage by this program. Afterwards in the process block 150 the variable configuration of the reserved non-virtual real hardware resource with the variable configuration is modified as it was specified in the request of the program. In the process block 160 a record of the executed modifications of the variable configuration of the reserved non-virtual real hardware resource with the variable configuration is generated. In the process block 170 the executed modifications of the variable configuration of the reserved non-virtual real hardware resource with the variable configuration is rolled back using the record after execution of the program, which has requested the modifications, is ended. The rolling back can be readily understood on the basis of the following examples. For instance, the server operates a list of services within an operating system installed on the server. Changes in the list of services are considered as modification of the variable configuration of the server. The list of services is stored in the record prior to executing changes in the list of services. When there is a need for rolling back the changes in the list of services running on the server, the list of services running within the operating system on the server is restored back according to the list of services stored in the record. Another example is a modification of a line in the configuration of a Hypertext Transfer Protocol (HTTP) server running on a non-virtual real hardware server. Rolling back of the variable configuration in this case constitutes the location of this modified line in the configuration file of the HTTP server and restoring it to an original state. In the process block 180 after the rolling back of the executed modifications of the variable configuration of the reserved non-virtual real hardware resource with the variable configuration the reservation of this cluster resource is cancelled.

At least a portion of the programs may have execution conflicts. Each program has a unique identification. The unique identifications of the programs having execution conflicts are stored in the list comprising one or more pairs of the unique identifications of the programs having execution conflicts when both programs of any pair are executed concurrently. For instance the execution conflict may be caused by the pair of programs requesting concurrently the cluster resource for the exclusive usage.

FIG. 3 illustrates a flowchart of process blocks of operating programs having execution conflicts on the computer cluster. In the process block 200 the programs are split in a minimum possible number of groups, wherein each group comprises no pairs of the programs having corresponding pairs of the unique identifications in the list. In other words each group comprises no pairs of the programs having the execution conflicts with each other. In process block 210 a schedule for execution of the programs is generated. All programs of each group are scheduled for concurrent execution and the groups of the programs are scheduled for consecutive execution. Consecutive execution of the groups is prioritized by number of the programs in the groups. The group comprising the highest number of the programs is scheduled as the first one for execution and the group comprising the least amount of programs is scheduled as the last one for execution. In a case when the groups comprise the same number of programs, then these groups are prioritized at random. In the process block 220 execution of the programs according to the schedule is started in the one or more created execution environments. In the process block 230 the execution conflict of the pair of the programs is detected. In the process block 240 one of the programs of said pair of the programs having the execution conflict detected is aborted. In the process block 250 the list is updated with the pair of the unique identifications of said pair of the programs having the execution conflict detected. In the process block 260 a new schedule for execution of the aborted program and the programs for which execution was not started yet is generated. In the process block 270 the programs are executed according to the new schedule in the one or more created execution environments after execution of the group comprising another program of the pair comprising the aborted program is finished.

FIG. 4 illustrates a flowchart of process blocks for splitting of the programs in groups used for generation of an execution schedule, generation of the execution schedule, and execution of the programs according to the execution schedule. In a process block 201 an additional group is generated. In the process block 202 one of the not yet assigned programs having no execution conflicts with all programs assigned to the additionally generated group is assigned to the additionally generated group. After execution of the process block 202 the decision process block 203 is executed. In the decision process block 203 it is checked whether there are any programs left which have no execution conflicts with any of the programs of the additionally generated group. If there are one or more programs left which have no execution conflicts with any of the programs of the additionally generated group then the process block 202 is executed. If there are no programs left that have no execution conflicts with any of the programs of the additionally generated group then a decision process block 204 is executed. In the decision process block 204 it is checked whether all programs are assigned to one or more groups. If not all programs are assigned to one or more groups then the process blocks 201, 202 and 203 are executed again. If all programs are assigned to one or more groups then a process block 261 is executed. In the process block 261 the process blocks 210, 220, 230, 240, and 250 are executed as described above and depicted in FIG. 3. In the process block 280 after the updating of the list with the pair of the unique identifications of the pair of the programs having the execution conflict detected all programs are identified which pairs in the list comprise the unique identification of the aborted program. In the process block 290 it is checked whether one or more not yet executed groups do not comprise any identified program. When one or more not yet executed groups do not comprise any identified program then the process block 291 is executed, otherwise the process block 292 is executed. In the process block 291 the aborted program is assigned to the not yet executed group not comprising any identified problem and having the highest priority for execution among the not yet executed groups. In the process block 291 execution of the aborted program is scheduled after execution of the last group.

In the process block 240 the selection of the program that has to be aborted can be performed by using one or a combination of the following criteria: the aborted program of the pair of programs having the execution conflict detected is the program that has a shorter duration of execution in comparison with another program of the pair, the aborted program of the pair of programs having execution conflict detected is the program which has a lower percentage of executed workload in comparison with the other program of the pair, the aborted program of the pair of the programs having executed conflict detected is the program which has a bigger number of the cluster resources requested for usage in comparison with the other program of the pair.

Figure 5:
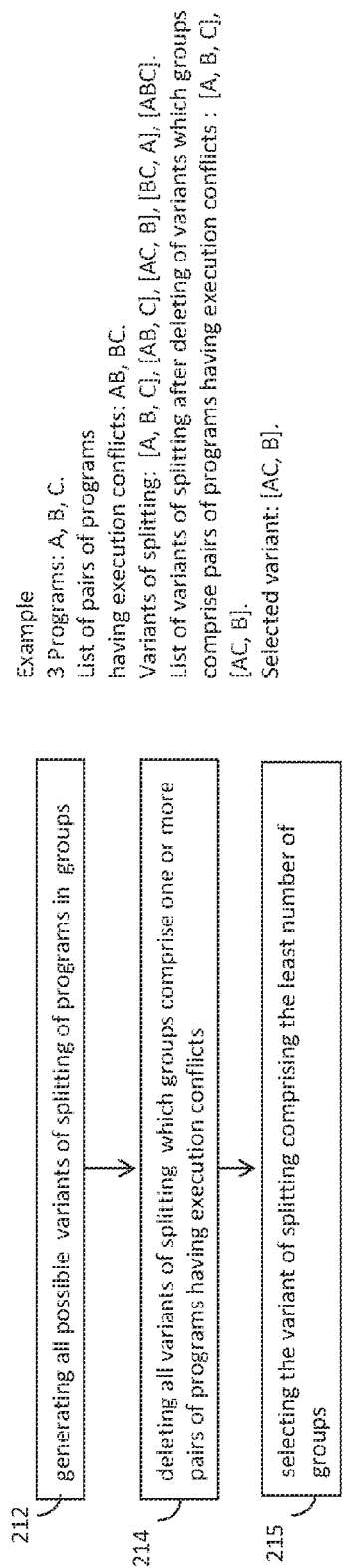
FIG. 5 is a flowchart of process blocks for splitting of programs in groups and an example of execution of the flowchart of the process blocks.

FIG. 5 depicts a flowchart of process blocks for splitting of the programs in the groups comprising the programs having no execution conflicts with each other and an example of execution of the flowchart of the process blocks. This flowchart is an example implementation of the process block 210. In the process block 212 all possible variants of splitting of the programs in the groups are generated. In the process block 214 all groups comprising programs having the execution conflicts with each other are deleted. In the process block 215 the variant of splitting comprising the list number of the groups is selected. The operation of this flowchart can be readily understood on the basis of the following example. For instance there are three programs, A, B and C and there is a need for generation of an optimum schedule for execution of these programs. There are two pairs of programs having execution conflicts: A B and B C. Execution of the process block 212 results in a generation of the following variants: a first variant [A, B, C], a second variant [AB, C], a third variant [AC, B], a fourth variant [BC, A], and a fifth variant [ABC]. In the first variant the programs are split in three groups, wherein each group comprises one program. In the second, third, and fourth variants the programs are split in two groups, wherein one group comprises two programs and another group comprises one program. In the fifth variant all programs are in one group. In the process block 214 the fifth, the fourth and second variant are deleted, since these variants comprise groups of the programs having the execution conflict within one of the groups. In the process block 215 the third variant is selected since it comprises fewer groups than the first variant.

The cluster resources may be hierarchically allocated within one or more resource parent-child relationship trees and linked by resource parent-child relationships with each other within the one or more resource parent-child relationship trees. Each resource parent-child relationship tree matches a type parent-child relationship tree 400 comprising the hierarchically allocated types linked by type parent-child relations within the type parent-child relationship tree. The resource parent-child relationships match the type parent-child relationships of their types. Each resource parent-child relationship tree has one top root cluster resource 501. Each type parent-child relationship tree has one top root type 401.

Figure 6:
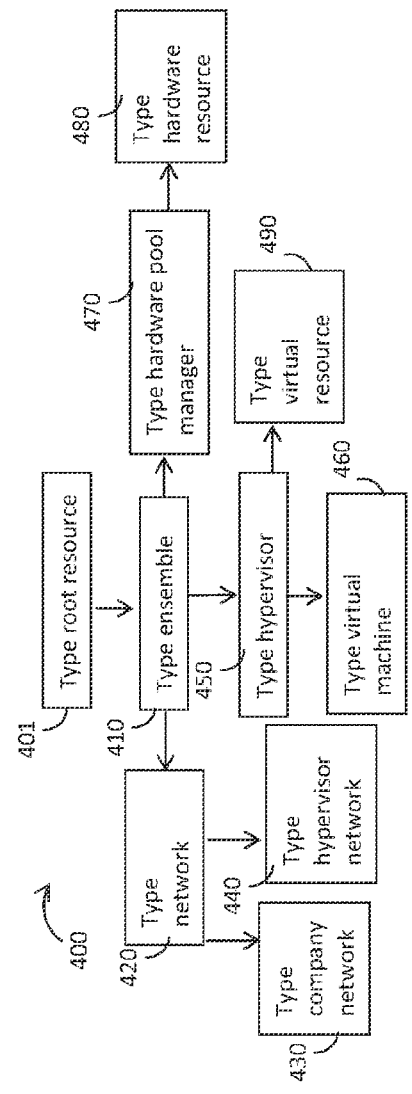
FIG. 6 is an example fragment of a type parent-child relationship tree of types of cluster resources.

FIG. 6 depicts an example type parent-child relationship tree 400. The type 'root resource' 401 is a root element of the type parent-child relationship tree 400. The type 'root resource' has a type 'ensemble' 410 as its child. The type 'ensemble' has the type 'root resource' as its parent. The type 'ensemble' has the following child types: a 'network' 420, a 'hardware pool manager' 470, and a 'hypervisor' 450. The type 'network' has the following child types: a 'company network' 430 and a 'hypervisor network' 440. The type 'hypervisor' has the following child types: a 'virtual machine' 460 and a 'virtual resource' 490. The type 'hardware pool manager' has a type 'hardware resource' 480 as its child type.

FIG. 7 depicts a fragment of a resource parent-child relationship tree 500 matching the type parent-child relationship tree 400. The root resource 500 is the root element of the resource parent-child relationship tree. It has the type 'root resource' 401 depicted in FIG. 7. The root resource 501 has a first ensemble 510 and a second ensemble 511 as its child resources. The first ensemble and the second ensemble have the type 'ensemble' as depicted in FIG. 7. The resource parent-child relationships for the root resource with its child resources (the first ensemble and the second ensemble) correspond to the type parent-child relationship of their types depicted in FIG. 7. The first ensemble 510 has a first hardware pool manager 550 as its child resource. The second ensemble has a second hardware pool manager 570 as its child resource. The hardware pool managers have the type 'hardware pool manager' 470 as depicted in FIG. 7. The resource parent-child relationships between the ensembles and the hardware pool managers correspond to the type parent-child relationship of their types as depicted in FIG. 7. The first hardware pool manager 550 has a first hardware resource 560 and a second hardware resource 580 as its child resources. The second hardware pool manager 570 has a third hardware resource 590 and a fourth hardware resource 592 as its child resources. The hardware resources have the type 'hardware resource' 480 as depicted in FIG. 7. The resource parent-child relationships between the hardware pool managers and the hardware resources correspond to the type parent-child relationship of their types as depicted in FIG. 7.

FIG. 8 illustrates a flowchart of process blocks for identification of the cluster resources. The identification of the cluster resources is needed in the process block 100 and the process block 120 of the flowchart diagram depicted in FIG. 2. In the process block 300 first fragments of the one or more type parent-child relationship trees linking the one or more root elements or the one or more type parent-child relationship trees with the environment-specific types allocated in bottoms of the first fragments are identified. The environment specific types are specified in the process block 100. Identification of the first fragments may be executed using a bottom-up approach. First the parent types of environment specific types are identified. Afterwards the parent types of the identified types are identified. The latter procedure is performed until the root type of the first fragments is identified. In process block 310 second fragments of the one or more resource parent-child relationship trees matching the first fragments are identified. All cluster resources allocated at the bottoms of the second fragments have the environment specific types. The identifying of the cluster resources for the generation of the one or more dedicated execution environments as specified in the process block 100 is performed using the cluster resources allocated at the bottoms of the second fragments. Identification of the cluster resources in this process block may be performed using top-down approach. First the top root cluster resources having the top root types are identified. Afterwards the child cluster resources of the top root cluster resources are identified, wherein the identified child cluster resources have the same types as child types of the top root types within the first fragments. The latter procedure is repeated until the cluster resources having environment specific types are reached. In the process block 320 the second fragments are stored in a registry. The storing of the second fragments in the registry may accelerate further identification of another needed cluster resource. It may be a lot faster and easier to find the needed cluster resource in the registry rather than performing the process blocks 300 and 310 again, because the registry may comprise at least one following type of cluster resource information/characterization: physical addresses of the cluster resources, logical addresses of the cluster resources, configurations of the cluster resources. In a process block 340 one or more first adjacent fragments of the one or more resource parent-child relationship trees are identified using a lazy thunk identification. Each first adjacent fragment is adjacent to the one of the second fragments. The lazy thunk identification of the one or more first adjacent fragments may be a low priority computer process. It serves the purpose of further collection of cluster resources that are not yet stored in the registry and for which identification was not yet requested. As a result the registry will contain even more cluster resources and any subsequent identification of the needed cluster resource may be performed faster by searching first in the registry. In the process block 350 the registry is updated with the one or more identified first adjacent fragments.

Performance of the flowchart depicted on the FIG. 8 can be readily understood on a basis of the following example illustrated in the FIG. 7. Suppose the cluster resource having the type 'hardware resource' has to be identified. Processing of the type parent-child relationship tree 400 according to the process block 300 results in identification of the first fragment comprising the type 'root resource' 401, the type 'ensemble' 410, the type 'hardware pool manager' 470, and the type 'hardware resource' 480. The first fragment of the type parent-child relationship tree has the second matching fragment 500 of the resource parent-child relationship tree. The second fragment comprises the root resource 501, the first ensemble 510, the second ensemble 511, the first hardware pool manager 550, the second hardware pool manager 570, the first hardware resource 560, the second hardware resource 580, the third hardware resource 590, and the fourth hardware resource 592. As a result of execution of the process block 310 the needed hardware resource is identified using the first, the second, the third, and the fourth hardware resource in the process block 110. Execution of the process block 340 results in performing of a first lazy thunk identification 520 of the not yet identified child cluster resources of the first ensemble 510 and a second lazy thunk identification 530 of the not yet identified child cluster resources of the second ensemble 511.

The identification of the one or more fragments of the one or more resource parent-child relationship trees may be performed by applying one or more predefined identification constraints restricting the identifying of the fragments of the one or more resource parent-child relationship trees. Going back to the aforementioned example this procedure can be illustrated as follows. For instance it is known upfront that the first ensemble 510 will be shut down for maintenance during execution of the programs. Therefore, it may not be selected for the creation of the one or more dedicated environments. During top-down identification of the needed hardware resource for the generation of the one or more dedicated execution environments a custom child getter comprising the aforementioned constraint is activated. As a result of identification of the cluster resources using the custom child getter is depicted in FIG. 9. First the root resource 501 is identified as it was described previously. Afterwards only the second ensemble 511 is identified as the child cluster resource of the root resource 501 because of applying the custom child getter restricting the identification of the first ensemble 510. Afterwards only the third hardware resource 590 or the fourth hardware resource 592 is identified in the same way as it is described above. However, the not yet identified child cluster resources of the root resource 501 may be identified by performing the third lazy thunk identification 594. Other not yet identified child cluster resources of the second ensemble 511 may be identified by performing the second lazy thunk identification 530.

The registry may be further used for the identifying of the cluster resource upon the request of the program for usage of the cluster resource as described in the process block 120.

Figure 10:
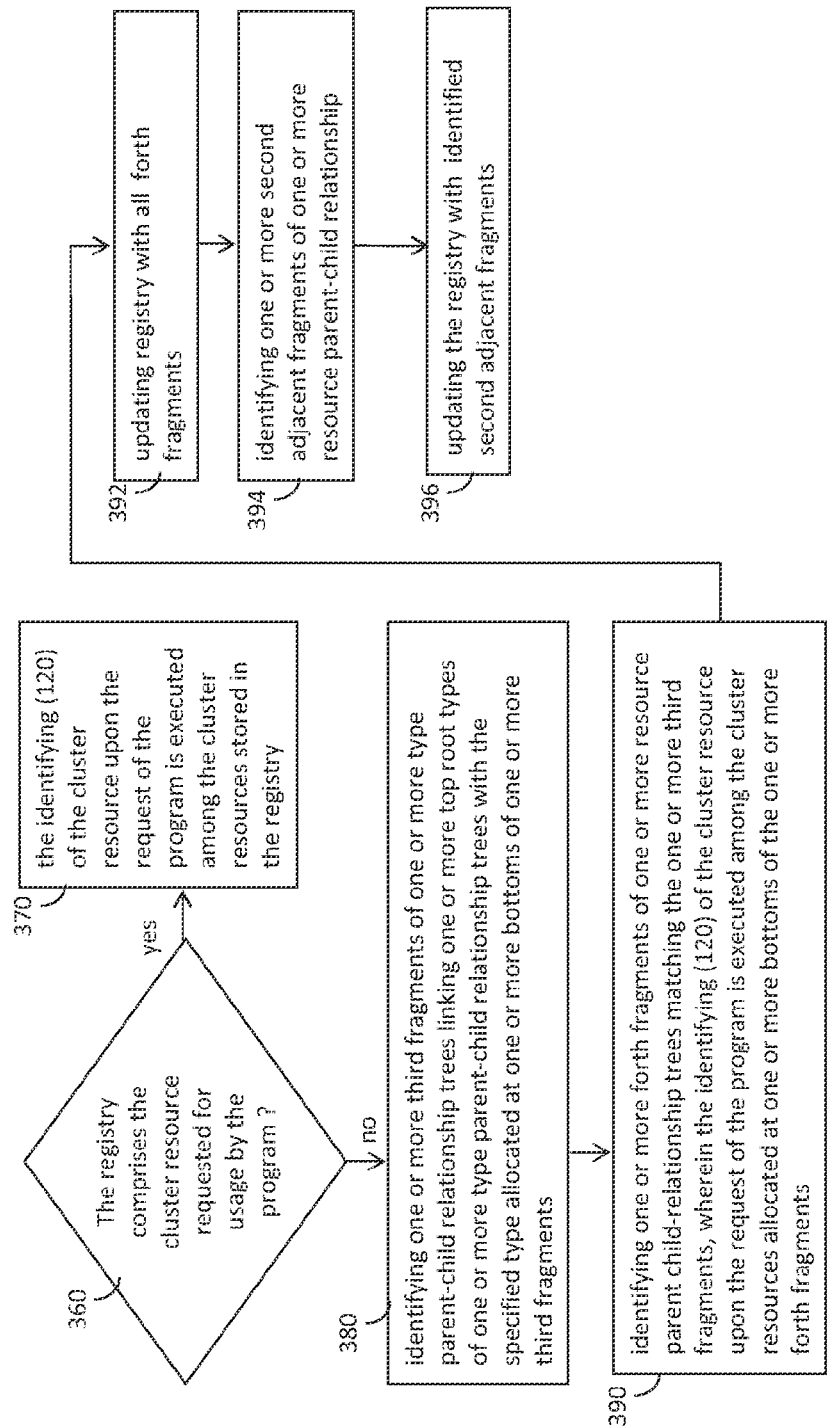
FIG. 10 is another flowchart of process blocks for identification of cluster resources.

FIG. 10 illustrates a flowchart for identifying of the cluster resource upon the request of the program. In a decision process block 360 it is checked whether the registry comprises the cluster resource requested for usage by the program. If this statement is correct the process block 370 is performed, wherein the identifying of the cluster resource upon the request of the program for usage of the cluster resource is performed using the fragments of the one or more resource parent-child relationship trees stored in the registry. If this statement is not correct the following process blocks are defined. In the process block 380 one or more third fragments of the one or more type parent-child relationship trees linking one or more top root types with a specified type allocated at one or more bottoms of the one or more third fragments are identified. In a process block 390 one or more fourth fragments of the one or more resource parent-child relationship trees matching the one or more third fragments are identified. In this case the identifying of the cluster resources upon the request of the program for usage of the cluster resource is performed using the cluster resources allocated at the one or more bottoms of the one or more fourth fragments. All cluster resources allocated to the one or more bottoms of the one or more fourth fragments have the specified type. In the process block 392 the registry is updated with all fourth fragments. In the process block 394 one or more second adjacent fragments of the one or more resource parent-child relationship trees are identified by using the lazy thunk identification. Each second adjacent fragment is adjacent to the one or more fourth fragments. In the process block 396 the registry is updated with identified second adjacent fragments.

FIG. 11 illustrates a flowchart of process blocks of an example process used for generating of the one or more dedicated environments for execution of the programs using the identified cluster resources as described in the process block 110. In the process block 700 the one or more dedicated environment descriptions are phrased and validated. The execution environment description may comprise a list of all the required cluster resources, their configurations and types. The execution environment description may be in the form of an extended mark-up language (XML) file listing addresses of servers allocated within the cluster along with a list of operating system installation media, image names to be used for installing of operating systems on the servers. Phrasing the execution environment description may be creating such a description in a machine-readable format. Validating the execution environment description may be checking syntactic and semantic consistency of the execution environment description. For instance one can verify that the XML file is syntactically valid and the amount of resources requested does not exceed the acting user's quota and that operating system images are compatible with the target server's hardware. In the process block 710 the one or more virtual machines are created using the one or more identified virtual resources. In the process block 720 the one or more identified non-virtual real hardware resources are reserved. In the process block 730 the one or more identified (reserved) non-virtual real hardware resources are connected to the one or more virtual machines. This process can be readily understood on the basis of the following example. For instance the non-virtual real hardware resource is a server. Connection of this server can be performed by configuring network devices between this server and the virtual machine in a way that allows network communication between them. If the non-virtual real hardware resource is a card installed on the non-virtual real hardware server, then connection can be performed by executing the following: establishing a network connection to the non-virtual real hardware server; installing a driver that captures outgoing data and injects incoming data into this card and further into an operating system running on the non-virtual real hardware server; installing a driver that injects all the outgoing data and captures incoming data into operators of the operating system running on a virtual machine effectively simulating the presence of this card or the virtual machine; forwarding the outgoing data from the driver running on the non-virtual real hardware server to the driver running on the virtual machine and forwarding incoming data from the driver running on the virtual machine to the driver running on the non-virtual real hardware server. In the process block 740 one or more operating systems are installed on the one or more virtual machines. In the process block 750 the one or more connected non-virtual real hardware resources with the variable configurations are configured. In the process block 760 the programs and other software packages are installed on the one or more virtual machines.

FIG. 12 illustrates a modular structure of a software package operable for operating programs on a computer cluster. The software package comprises the following modules: a user module 800, an environment manager 810, a resource manager 820, a program execution manager 830, and a resource reservation database 840. The user module 800 comprises a description of dedicated execution environments 801, a list of descriptions of dedicated resources required for generation of the dedicated execution environments 802, and a list of the programs to be executed on the computer cluster 804. The user module provides the description of the dedicated execution environments to the environment manager. It further provides the description and list of the required resources to the resource manager and the list of programs to the program execution manager. The resource manager generates a registry 821 upon receiving the list and description of the dedicated resources. Further it identifies resources required for generation of the dedicated execution environments, stores them in the registry, and provides them to the environment manager for generation of the execution environments. The resource manager performs lazy thunk identification of other cluster resources and stores them in the registry. The environment manager generates the execution environments 811 upon receiving the list of identified cluster resources from the resource manager. The program execution manager generates a schedule of execution for the programs upon receiving the list of programs from the user module. The schedule is generated using a list 831 of execution conflicts of the programs in a way that the execution conflicts are avoided. Afterwards the program execution manager starts execution of the programs according to the schedule.

When execution of the programs is started the program execution manager receives requests for usage of the cluster resources and forwards them to the resource manager. The resource manager identifies the requested cluster resources, stores them in the registry, and provides them to the programs. It also performs reservations of the cluster resources, modifications in the variable configurations of the non-virtual real hardware resources with the variable configurations, rolls back the modifications of the variable configurations of the non-virtual real hardware resources with the variable configurations. The reservations and the modifications are stored in the resource reservation database 840. The resource manager reports to the program execution manager reservation and/or sharing conflicts of the cluster resources caused by the programs. As a reaction on these reports the execution manager updates the list of the execution conflicts and generates a new schedule for execution of the programs. Afterwards it starts executing programs according to the new schedule. When execution of one or more programs is finished the program execution manager reports the results of execution of the one or more programs 832 to the user module.

FIG. 13 illustrates an example software code implementation of resource handling in a "Scala" programming language. Trait Resource enables establishing of parent-child relationships between resources by providing "parent( )" and "children( )" methods. "Resource.children( )" method returns an iterable object enabling implementation of lazy thunk child resource retrieval. Classes "ServerChassis," "Server," "Hypervisor," and "VirtualServer" are examples of cluster resource. Note that they override "Resource.parent( )" method and provide a specialized return type. This enables establishing of parent-child relationships between the cluster resource types. The software code illustrated in FIG. 13 may comprise deals of resource-specific operations, such as parent retrieval, children retrieval, configuration retrieval, configuration changes and rollback. Those skilled in the art will understand this software code in every detail.

FIG. 14 illustrates a resource type hierarchy or in the other words a type parent-child relationship tree. This hierarchy is used in the software code example illustrated in FIG. 13. As defined by the framework of this approach, the root cluster resource has always a type "root." This example deals with a server chassis, which have different hardware mounted on it. The child type of the "root" type in this hierarchy is "server chassis" type. The "server chassis" type has the following types as child types: "server chassis management module," "server management module," "server," "network router", and "disk array". In return the "server" type has the following child types: "motherboard," "central processing unit," "memory", and "hypervisor". The type "server network card" has a child type "server network card port", the type "hypervisor" has a child type "virtual server," the type "network router" has a child type "network router port", and the type "disk array" has a child type "disk".

The invention claimed is:

1. A computer system for operating programs executable on a computer cluster comprising cluster resources, wherein the cluster resources comprise the following: non-virtual real hardware resources with variable configurations and virtual resources, wherein each cluster resource has a configuration description and a type, wherein each type has a unique type identification and descriptions of operations that can be performed by the cluster resource of the each type,
wherein the computer system comprises a processor and a memory coupled to the processor, wherein the memory comprises instructions which, when executed by the processor, cause the processor to:
identify cluster resources for generation of one or more dedicated execution environments, wherein execution of each program requires a dedicated execution environment on the computer cluster; and
generate the one or more dedicated execution environments for execution of programs using the identified duster resources, wherein generation of each dedicated execution environment requires a plurality of virtual resources including one or more dedicated virtual resources and one or more dedicated non-virtual real hardware resources with the variable configurations, wherein each dedicated resource has an execution environment specific type and an execution environment specific configuration description, wherein each identified cluster resource matches one dedicated resource, wherein each identified cluster resource and the matching dedicated resource have the same type, and wherein the configuration description of each identified cluster resource comprises the execution environment specific configuration description of the matching dedicated resource, wherein at least a portion of programs have execution conflicts, wherein each program has a unique identification, wherein the unique identifications of the programs having execution conflicts are stored in a list comprising one or more pairs of the unique identifications of the programs having execution conflicts when both programs of any pair are executed concurrently, wherein the instructions further cause the processor to:

split the programs in a minimum possible number of groups, wherein each group comprises no pairs of the programs having corresponding pairs of the unique identifications in the list;

generate a schedule for execution of the programs, wherein all programs of each group are scheduled for concurrent execution and the groups of the programs are scheduled for consecutive execution, wherein consecutive execution of the groups is prioritized according to a number of the programs in the groups, wherein the group comprising the highest number of programs is scheduled as the first group for execution and the group comprising the least number of programs is scheduled as the last group for execution, wherein responsive to two groups comprising the same number of programs the two groups are prioritized at random;

start execution of the programs according to the schedule in the one or mote generated dedicated execution environments;

detect an execution conflict of a pair of the programs;

abort one of the programs of the pair of the programs having the execution conflict detected;

update the list with the pair the unique identifications of the pair of the programs having the execution conflict detected;

generate a new schedule for execution of the aborted program and programs for which execution was not started yet; and start execution of the programs according to the new schedule in the one or more generated dedicated execution environments after execution of the group comprising another program of the pair is finished.

2. The computer system of claim 1, wherein the cluster resources are hierarchically allocated within one or more resource parent-child relationship trees and linked by resource parent-child relationships with each other within the one or more resource parent-child relationship trees, wherein each resource parent-child relationship tree matches a type parent-child relationship tree comprising the hierarchically allocated types linked by type parent-child relations within the type parent-child relationship tree, wherein the resource parent-child relationships match the type parent-child relationships of their types, wherein each resource parent-child relationship tree has one top root cluster resource, wherein each type parent-child relationship tree has one top root type, wherein each top root cluster resource of each resource parent-child relationship tree has the top root type of the type parent-child relationship tree matching the each resource parent-child relationship tree, wherein the identifying of the cluster resources for the generation of the one or more dedicated execution environments comprises:

identifying first fragments of the one or more type parent-child relationship trees linking the one or more top root types of the first fragments with the environment specific types allocated at bottoms of the first fragments;

identifying second fragments of the one or more resource parent child-relationship trees matching the first fragments, wherein the identifying of the cluster resources for the generation of the one or more dedicated environments is performed using the cluster resources allocated at bottoms of the second fragments, wherein all cluster resources allocated at bottoms of the second fragments have the environment specific types;

storing the second fragments in a registry; and identifying one or more first adjacent fragments of one or more resource parent-child relationship trees using a lazy thunk identification, wherein each first adjacent fragment is adjacent to one of the second fragments; and updating the registry with all identified first adjacent fragments.

3. The computer system of claim 1, wherein the dedicated environment comprises a virtual machine operated by an operating system, wherein the generating of the one or more dedicated environments using the identified cluster resources comprises:

creating the virtual machine using one or more identified virtual resources;

connecting the identified non-virtual real hardware resource with the variable configuration to the virtual machine; and installing the operating system on the virtual machine.

4. A computer program product for operating programs executable on a computer cluster comprising cluster resources, wherein the cluster resources comprise non-virtual real hardware resources with variable configurations and virtual resources, wherein each cluster resource has a configuration description and a type, wherein each type has a unique type identification and descriptions of operations that can be performed by the cluster resource of each type, wherein the computer program produce comprises a computer readable storage medium carrying computer executable code for execution by a processor, wherein execution of the computer executable code causes the processor to:

identify the cluster resources for generation of one or more dedicated execution environments, wherein execution of each program requires the dedicated execution environment on the computer cluster, and generate the one or more dedicated execution environments for execution of programs using the identified cluster resources, wherein generation of each dedicated execution environment requires a plurality of virtual resources including one or more dedicated virtual resources and one or more dedicated non-virtual real hardware resources with the variable configurations, wherein each dedicated resource has an execution environment specific type and an execution environment specific configuration description, wherein each identified cluster resource matches one dedicated resource, wherein each identified cluster resource and the matching dedicated resource have the same type, and wherein the configuration description of each identified cluster resource comprises the execution environment specific configuration description of the matching dedicated resource, wherein at least a portion of programs have execution conflicts, wherein each program has a unique identification, wherein the unique identifications of the programs having execution conflicts are stored in a list comprising one or more pairs of the unique identifications of the programs having execution conflicts when both programs of any pair are executed concurrently, wherein the computer executable code further causes the processor to:

split the programs in a minimum possible number of groups, wherein each group comprises no pairs of the programs having corresponding pairs of the unique identifications in the list;

generate a schedule for execution of the programs, wherein all programs of each group are scheduled for concurrent execution and the groups of the programs are scheduled for consecutive execution, wherein consecutive execution of the groups is prioritized according to a number of the programs in the groups, wherein the group comprising the highest number of programs is scheduled as the first group for execution and the group comprising the least number of programs is scheduled as the last group for execution, wherein responsive to two groups comprising the same number of programs the two groups are prioritized at random;

start execution of the programs according to the schedule in the one or more generated dedicated execution environments;

detect an execution conflict of a pair of programs;

abort one of the programs of the pair of the programs having the execution conflict detected;

update the list with the pair the unique identifications of the pair of the programs having the execution conflict detected;

generate a new schedule for execution of the aborted program and programs for which execution was not started yet; and start execution of the programs according to the new schedule in the one or more generated dedicated execution environments after execution of the group comprising another program of the pair is finished.

5. The computer system of claim 1, wherein each program is operable for requesting usage of the cluster resource specifying the type and the configuration description, wherein the instructions further cause the processor to:

identify the cluster resource responsive to a request of the program for usage of the cluster resource, wherein the identified cluster resource has the specified type, wherein the configuration description of the identified cluster resource comprises the specified configuration description.

6. The computer system of claim 1, wherein each program is operable for requesting a modification of the variable configuration of the non-virtual real hardware resource with the variable configuration, wherein the instructions further cause the processor to:

in response to a request of a given program for a modification of the variable configuration of the non-virtual real hardware resource with the variable configuration, reserve the non-virtual real hardware resource with the variable configuration for exclusive usage by the given program and executing the requested modification of the variable configuration of the non-virtual real hardware resource with the variable configuration;

generate a record of the executed modifications of the variable configuration of the non-virtual real hardware with the variable configuration;

roll back the executed modifications of the variable configuration of said non-virtual real hardware resource with the variable configuration using the record responsive to determining execution of the given program is ended; and responsive to rolling back the executed modifications, cancel the reserving of the non-virtual real hardware resource with the variable configuration.

7. The computer program product of claim 4, wherein each program is operable for requesting a modification of the variable configuration of the non-virtual real hardware resource with the variable configuration, wherein the computer executable code further causes the processor to:

in response to a request of a given program for a modification of the variable configuration of the non-virtual real hardware resource with the variable configuration, reserve the non-virtual real hardware resource with the variable configuration for exclusive usage by the given program and executing the requested modification of the variable configuration of the non-virtual real hardware resource with the variable configuration;

generate a record of the executed modifications of the variable configuration of the non-virtual real hardware with the variable configuration;

roll back the executed modifications of the variable configuration of said non-virtual real hardware resource with the variable configuration using the record responsive to determining execution of the given program is ended; and responsive to rolling back the executed modifications, cancel the reserving of the non-virtual real hardware resource with the variable configuration.

8. The computer system of claim 1, wherein at least a portion of programs have execution conflicts, wherein each program has a unique identification, wherein the unique identifications of the programs having execution conflicts are stored in a list comprising one or more pairs of the unique identifications of the programs having execution conflicts when both programs of any pair are executed concurrently, wherein the instructions further cause the processor to:

a) generate an additional group;

b) assign one of the not yet assigned programs having no execution conflicts with all programs assigned to the additional group;

c) repeat step b) until there are no programs left that have no execution conflicts with any of the programs of the additional group;

d) iteratively repeat the steps a)-c), wherein the repeating is continued until all programs are assigned to one or more groups, wherein exactly one additional group is generated during each repeating of the steps a)-c), wherein all pairs comprising at least one unique identification of any of the programs assigned to any previously generated additional group are considered as being deleted from the list during the subsequent repeating of the steps a)-c);

generate a schedule for execution of the programs, wherein all programs of each group are scheduled for concurrent execution and the groups of the programs are scheduled for consecutive execution, wherein consecutive execution of the groups is prioritized according to a number of the programs in the groups, wherein the group comprising the highest number of programs is scheduled as the first group for execution and the group comprising the least number of programs is scheduled as the last group for execution, wherein responsive to determining two groups comprise the same number of programs, the two groups are prioritized at random;

start of execution of the programs according to the schedule in the one or more generated dedicated execution environments;

detect an execution conflict of a pair of the programs;

abort one of the programs of the pair of the programs having the execution conflict detected;

update the list with the pair of the unique identifications of the pair of the programs having the execution conflict detected; and responsive to updating the list with the pair of the unique identifications of the pair of the programs having the execution conflict detected, identify all programs within the pairs in the list that comprise the unique identification of the aborted program;

responsive to identifying that one or more not yet executed groups do not comprise any identified program, assign the aborted program to the not yet executed group not comprising any identified programs and having the highest priority for execution among the not yet executed groups; and responsive to identifying that one or more not yet executed groups do comprise any identified program, schedule execution of the aborted program after execution of the last group.

9. The computer system of claim 1, wherein the aborted program of the pair of the programs is the program having a larger number of the cluster resources requested for usage in comparison with another program of the pair.

10. The computer system of claim 1, wherein each program has a workload to be processed during execution, wherein the aborted program of the pair of the programs is the program having a lower percentage of the executed workload in comparison with another program of the pair.

11. The computer system of claim 1, wherein the aborted program of the pair of the programs is the program having a shorter duration of execution in comparison with another program of the pair.

12. The computer system of claim 2, wherein identifying the cluster resource upon the request of the program for usage of the cluster resource comprises:

checking whether at least one of the cluster resources allocated in the fragments of the one or more resource parent-child relationship trees stored in the registry has the specified type and has the configuration description comprising the specified configuration description;

responsive to determining that at least one of the luster resources allocated in the fragments of the one or more resource parent-child relationship trees stored in the registry has the specified type and has the configuration description comprising the specified configuration description, the identifying of the cluster resource upon the request of the program for usage of the cluster resource is performed using the fragments of one or more resource parent-child relationship trees stored in the registry; and responsive to determining that at least one of the luster resources allocated in the fragments of the one or more resource parent-child relationship trees stored in the registry does not have the specified type or does not have the configuration description comprising the specified configuration description:

identifying one or more third fragments of the one or more type parent-child relationship trees linking the one or more top root types of the one or more type parent-child relationship trees with the specified type allocated at one or more bottoms of the one or more third fragments;

identifying one or more fourth fragments of the one or more resource parent child-relationship trees matching the one or more third fragments, wherein the identifying of the cluster resource responsive to the request of the given program for usage of the cluster resource is performed using the cluster resources allocated at one or more bottoms of the one or more fourth fragments, wherein all cluster resources allocated at the one or more bottoms of the one or more fourth fragments have the specified types;

updating the registry with all fourth fragments;

identifying one or more second adjacent fragments of the one or more resource parent-child relationship trees using the lazy thunk identification, wherein each second adjacent fragment is adjacent to one of the one or more fourth fragments; and updating the registry with the one or more second adjacent fragments.

13. The computer system of claim 2, wherein the identifying of the one or more fragments of the one or more resource parent child-relationship trees is performed applying one or more predefined identification constraints restricting the identifying of the fragments of the one or more resource parent-child relationship trees.

14. The computer program product of claim 4, wherein at least a portion of programs have execution conflicts, wherein each program has a unique identification, wherein the unique identifications of the programs having execution conflicts are stored in a list comprising one or more pairs of the unique identifications of the programs having execution conflicts when both programs of any pair are executed concurrently, wherein the computer executable code further causes the processor to:

a) generate an additional group;

b) assign one of the not yet assigned programs having no execution conflicts with all programs assigned to the additional group;

c) repeat step b) until there are no programs left that have no execution conflicts with any of the programs of the additional group;

d) iteratively repeat the steps a)-c), wherein the repeating is continued until all programs are assigned to one or more groups, wherein exactly one additional group is generated during each repeating of the steps a)-c), wherein all pairs comprising at least one unique identification of any of the programs assigned to any previously generated additional group are considered as being deleted from the list during the subsequent repeating of the steps a)-c);

generate a schedule for execution of the programs, wherein all programs of each group are scheduled for concurrent execution and the groups of the programs re scheduled for consecutive execution, wherein consecutive execution of the groups is prioritized according to a number of the programs in the groups, wherein the group comprising the highest number of programs is scheduled as the first group for execution and the group comprising the least number of programs is scheduled as the last group for execution, wherein responsive to determining two groups comprise the same number of programs, the two groups are prioritized at random;

start of execution of the programs according to the schedule in the one or more generated dedicated execution environments;

detect an execution conflict of a pair of the programs;

abort one of the programs of the pair of the programs having the execution conflict detected;

update the list with the pair of the unique identifications of the pair of the programs having the execution conflict detected; and responsive to updating the list with the pair of the unique identifications of the pair of the programs having the execution conflict detected, identify all programs within the pairs in the list that comprise the unique identification of the aborted program;

responsive to identifying that one or more not yet executed groups do not comprise any identified program, assign the aborted program to the not yet executed group not comprising any identified programs and having the highest priority for execution among the not yet executed groups; and responsive to identifying that one or more not yet executed groups do comprise any identified program, schedule execution of the aborted program after execution of the last group.

15. The computer program product of claim 4, wherein the cluster resources are hierarchically allocated within one or more resource parent-child relationship trees and linked by resource parent-child relationships with each other within the one or more resource parent-child relationship trees, wherein each resource parent-child relationship tree matches a type parent-child relationship tree comprising the hierarchically allocated types linked by type parent-child relations within the type parent-child relationship tree, wherein the resource parent-child relationships match the type parent-child relationships of their types, wherein each resource parent-child relationship tree has one top root cluster resource, wherein each type parent-child relationship tree has one top root type, wherein each top root cluster resource of each resource parent-child relationship tree has the top root type of the type parent-child relationship tree matching the each resource parent-child relationship tree, wherein the identifying of the cluster resources for the generation of the one or more dedicated execution environments comprises:

identifying first fragments of the one or more type parent-child relationship trees linking the one or more top root types of the first fragments with the environment specific types allocated at bottoms of the first fragments;

identifying second fragments of the one or more resource parent child-relationship trees matching the first fragments, wherein the identifying of the cluster resources for the generation of the one or more dedicated environments is performed using the cluster resources allocated at bottoms of the second fragments, wherein all cluster resources allocated at bottoms of the second fragments have the environment specific types;

storing the second fragments in a registry; and identifying one or more first adjacent fragments of one or more resource parent-child relationship trees using a lazy thunk identification, wherein each first adjacent fragment is adjacent to one of the second fragments; and updating the registry with all identified first adjacent fragments.

16. The computer program product of claim 4, wherein the dedicated environment comprises a virtual machine operated by an operating system, wherein the generating of the one or more dedicated environments using the identified cluster resources comprises:

creating the virtual machine using one or more identified virtual resources;

connecting the identified non-virtual real hardware resource with the variable configuration to the virtual machine; and installing the operating system on the virtual machine.

17. The computer program product of claim 4, wherein each program is operable for requesting usage of the cluster resource specifying the type and the configuration description, wherein the computer executable code further causes the processor to:

identify the cluster resource responsive to a request of the program for usage of the cluster resource, wherein the identified cluster resource has the specified type, wherein the configuration description of the identified cluster resource comprises the specified configuration description.

18. The computer program product of claim 4, wherein the aborted program of the pair of the programs is the program having a larger number of the cluster resources requested for usage in comparison with another program of the pair.

19. The computer program product of claim 4, wherein each program has a workload to be processed during execution, wherein the aborted program of the pair of the programs is the program having a lower percentage of the executed workload in comparison with another program of the pair.

20. The computer program product of claim 4, wherein the aborted program of the pair of the programs is the program having a shorter duration of execution in comparison with another program of the pair.

* * * * *